(12) United States Patent
Heafitz et al.

(10) Patent No.: US 11,136,140 B2
(45) Date of Patent: Oct. 5, 2021

(54) METHODS AND APPARATUS TO PROJECT AIRCRAFT ZONE INDICATORS

(71) Applicant: Aurora Flight Sciences Corporation, a subsidiary of The Boeing Company, Manassas, VA (US)

(72) Inventors: Andrew Mark Heafitz, Cambridge, MA (US); John Allee, Lexington Park, MD (US); Dominic Barone, Centerville, OH (US); Chris Bogdanowicz, Washington, DC (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 0 days.

(21) Appl. No.: 16/797,666

(22) Filed: Feb. 21, 2020

(65) Prior Publication Data

US 2021/0261270 A1   Aug. 26, 2021

(51) Int. Cl.
*B64D 47/06*   (2006.01)
*B64F 1/00*   (2006.01)

(52) U.S. Cl.
CPC .............. *B64D 47/06* (2013.01); *B64F 1/002* (2013.01)

(58) Field of Classification Search
CPC ................................ B64D 47/02; B64D 47/06
USPC ......................................................... 362/470
See application file for complete search history.

(56) References Cited

U.S. PATENT DOCUMENTS

| | | | | |
|---|---|---|---|---|
| 5,580,140 A | * | 12/1996 | Katz | G09F 19/16 353/13 |
| 6,411,890 B1 | | 6/2002 | Zimmerman | |
| 2005/0259150 A1 | * | 11/2005 | Furumi | G09F 21/06 348/144 |
| 2016/0041628 A1 | * | 2/2016 | Verma | G06F 3/017 345/156 |
| 2016/0236778 A1 | | 8/2016 | Takayama et al. | |
| 2017/0221394 A1 | * | 8/2017 | Garcia Morchon | G03B 21/608 |
| 2020/0401139 A1 | * | 12/2020 | Nakai | G06K 9/0063 |

* cited by examiner

*Primary Examiner* — Christopher M Raabe
(74) *Attorney, Agent, or Firm* — Hanley, Flight & Zimmerman, LLC

(57) ABSTRACT

Methods and apparatus to project aircraft zone indications are disclosed. A disclosed example projection system for displaying an indicator pertaining to an aircraft includes a condition analyzer to determine a condition of at least one of the aircraft or a zone surrounding the aircraft, and a projector to project the indicator on or proximate the zone based on the determined condition.

21 Claims, 9 Drawing Sheets

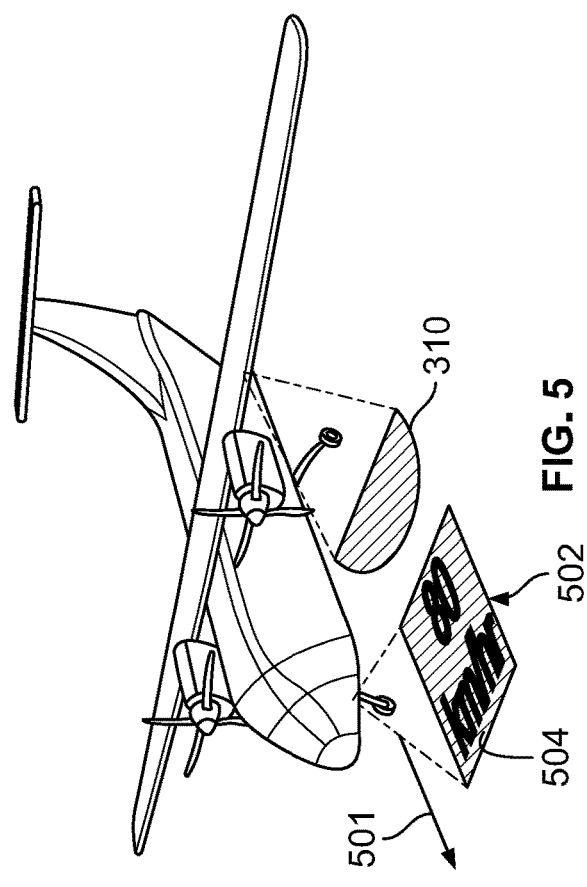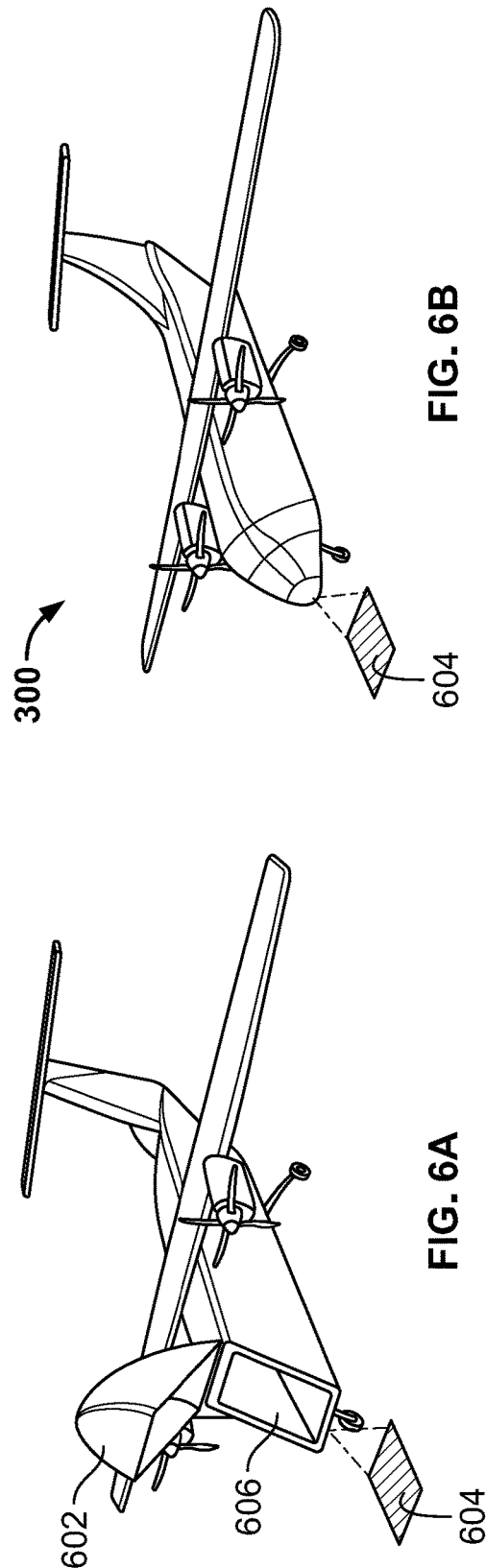

METHODS AND APPARATUS TO PROJECT AIRCRAFT ZONE INDICATORS

FIELD OF THE DISCLOSURE

This disclosure relates generally to aircraft and, more particularly, to methods and apparatus to project aircraft zone indicators.

BACKGROUND

When an aircraft is sitting on the ground, areas surrounding and/or proximate the aircraft can be relevant to persons associated with the aircraft, such as crew members, maintenance staff, airline staff, passengers, etc. To inform these persons of the relevant areas, printed markings on the aircraft or on the ground are used to indicate the areas. However, the printed markings may not accurately convey a location and/or size of the areas due to variations between aircraft.

Sometimes the printed markings include zone indicators (e.g., engine areas, clearance zones, etc.) that are permanently fixed onto the ground (i.e., as painted areas). Accordingly, these zone indicators do not vary with specific aircraft positions or operating conditions, such as engine thrust levels. Further, the zone indicators do not generally vary with different aircraft types and sometimes require a person to estimate their boundaries.

SUMMARY

An example projection system for displaying an indicator pertaining to an aircraft includes a condition analyzer to determine a condition of at least one of the aircraft or a zone surrounding the aircraft, and a projector to project the indicator on or proximate the zone based on the determined condition.

An example method includes determining, by executing instructions with at least one processor, a condition associated with at least one of an aircraft or a zone surrounding the aircraft, and projecting, by a projector, an indicator onto the zone based on the determined condition.

An example non-transitory machine readable medium comprises instructions, which when executed, cause a processor to at least determine a condition of at least one of an aircraft or a zone surrounding the aircraft, determine an indicator based the determined condition, and cause a projector to project the indicator onto the zone based on the determined indicator.

BRIEF DESCRIPTION OF THE DRAWINGS

FIGS. 4A-7B depict example projector implementations for fixed wing aircraft.

Figure 1:
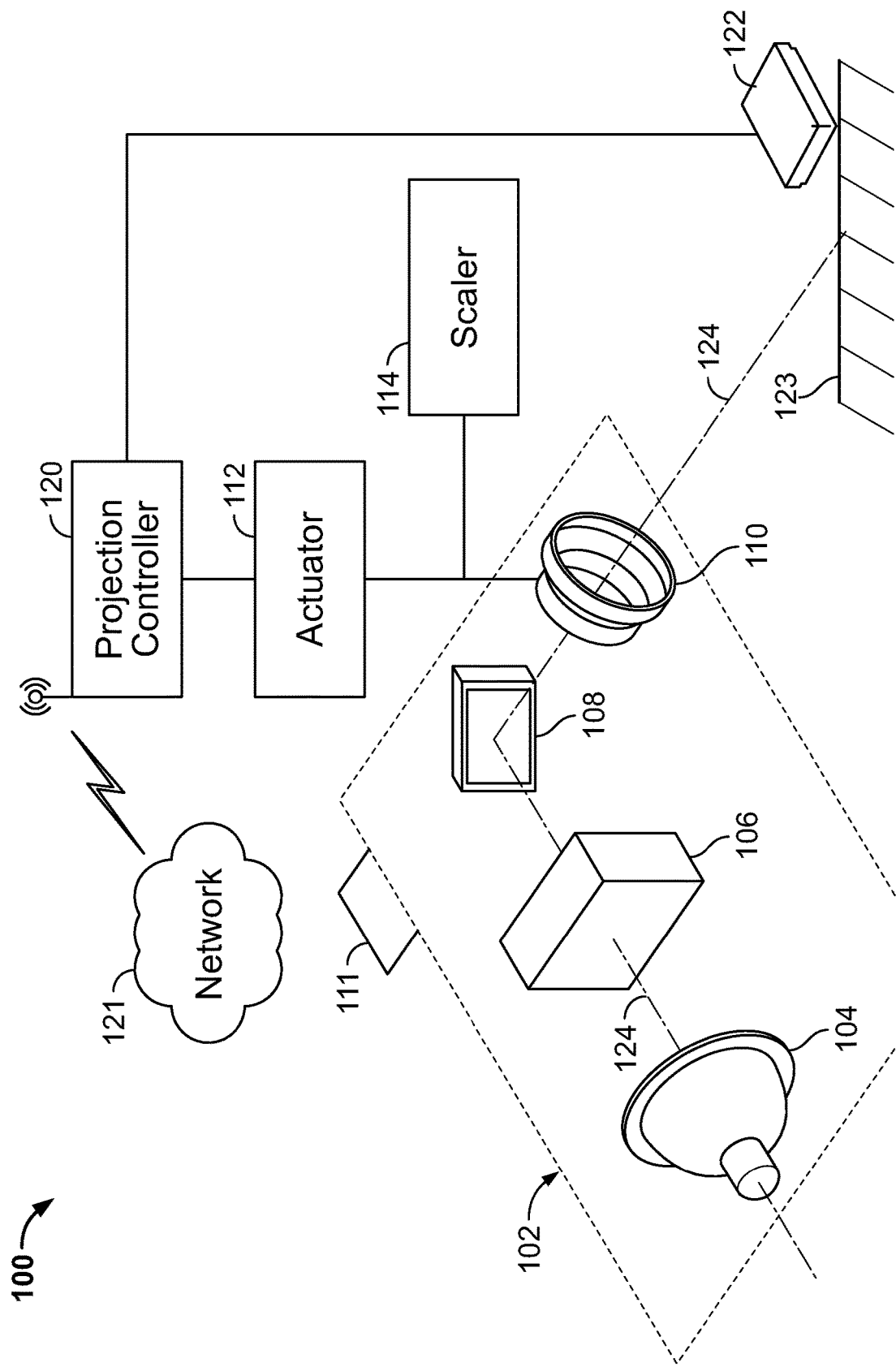
FIG. 1 depicts an example aircraft zone indication projection system in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to project aircraft zone indicators are disclosed. Some known aircraft zone indicators are defined by printed markings on the ground or on an aircraft. However, these markings may not be visible in certain conditions (e.g., night conditions) and do not typically convey an actual condition and/or status of the aircraft. Further, for these known implementations, some aircraft-related zones, such as a rotor or engine clearance area, may not be clearly or accurately demarcated, thereby requiring persons near the aircraft to estimate the areas and/or boundaries thereof.

Examples disclosed herein enable a highly visible, informative and adaptable indication of a zone or area pertaining to an aircraft (e.g., a zone surrounding the aircraft). Examples disclosed utilize a condition analyzer to determine a condition associated with at least one of an aircraft or zone surrounding the aircraft, and a projector to project an indicator on or proximate the zone based on the determined condition. In operation, the indicator can be projected proximate the aircraft to inform and/or warn persons nearby. Examples disclosed herein can be utilized by pilots to facilitate maneuvering (e.g., taxiing) an aircraft (e.g., a rotorcraft) by displaying an indicator associated with moving parts of the aircraft (e.g., spinning rotors), which can be difficult to see. Examples disclosed herein can also convey a status of the aircraft, such as whether the aircraft is moving or whether the aircraft is ready to receive cargo or passengers, for example.

In some examples, a sensor is implemented to detect a person and/or an object proximate the aircraft. In some such examples, the detection of the person may cause the projector to display an indicator with a warning message (e.g., warning colors and/or graphics). In some examples, an indicator is projected onto an area near an engine (e.g., an exhaust or inlet area of the engine). In some examples, the detection of the person within a requisite range of the aircraft disables activation of an aircraft engine and/or causes an alarm to be triggered.

In some examples, a scaler is implemented to convey information related to the aircraft. For example, an indicator (e.g., a projection of an image) projected by the projection system can be scaled in size (e.g., while preserving proportions) based on an aircraft parameter (e.g., an aircraft parameter value, a numeric aircraft parameter value). The aircraft parameter may be related to engine rotation speed, a rotor speed, a travel speed of the aircraft, an aircraft type, etc. Additionally or alternatively, an intensity of a projected image can be varied based on ambient light conditions (e.g., by use of a photocell).

As used herein, the term "projector" refers to a device, assembly and/or component utilized to project a two-dimensional image onto a surface (e.g., the ground). As used herein, the term "indicator" refers to projected graphics, messages, markings and/or lettering (or combination thereof). As used herein, the terms "zone," and "aircraft zone" refer to an area on a surface (e.g., the ground) on which an aircraft is to be supported (e.g., for stopping, landing, etc.). Accordingly, the terms "zone" and "aircraft zone" correspond to an area and/or region proximate an aircraft, which may be moving or sitting on the surface.

FIG. 1 depicts an example aircraft zone indication projection system 100 in accordance with teachings of this disclosure. The aircraft zone indication projection system 100 of the illustrated example includes a projector 102 which, in turn, includes a light source (e.g., a laser light source, a laser assembly, a bulb, an LED an LED array, a light assembly, etc.) 104, an optical element (e.g., an optical diffuser) 106, a display (e.g., a microdisplay, a liquid crystal display (LCD) display, a dot matrix display (DMD), a liquid crystal on silicon (LCOS) display, etc.) 108 and a lens (e.g., a projection lens, a movable lens, an adjustable lens, etc.) 110. The example aircraft zone indication projection system 100 also includes a mount 111, an actuator 112, a scaler (e.g., a motorized scaler, etc.) 114, and a projection controller 120. In some examples, the aircraft zone indication projection system 100 includes a sensor 122, which may be implemented as an optical sensor, a thermal sensor, a motion sensor, a positional sensor, etc. In some examples, the aircraft zone indication projection system 100 is communicatively coupled to a network (e.g., a wireless network) 121. The aircraft zone indication projection system 100 may be implemented on an aircraft and/or a structure supported by a surface 123. In particular, the mount 111 can couple the projector 102 to an aircraft or a structure on or proximate the surface 123.

To project an indicator (e.g., a projection, a projected indication, a projected graphic, a projected zone, a projected image indicating a zone, etc.) associated with an aircraft zone, the light source 104 directs light toward the optical element 106, which is implemented as an optical diffuser in this example. In turn, a generated image (e.g., text, graphics, symbols, lines, etc.) from the display 108 is combined with the light from the light source 104 and emitted from the lens 110. As a result, the image is projected toward the surface 123, thereby displaying the indicator thereon. In the illustrated example of FIG. 1, the path of the light is generally indicated by lines 124. However, any other appropriate projection type and/or system can be implemented instead (e.g., a laser projection system, etc.).

In some examples, the actuator 112 is implemented to orient, align and/or adjust the projector 102 and/or the lens 110. For example, the actuator 112 can translate and/or pivot the projector 102 based on sensor data from the sensor 122. Additionally or alternatively, the scaler 114 varies a scale of the indicator projected onto the surface 123 by the projector 102. In some examples, the projector 102 is activated and/or images from the display 108 are adjusted based on sensor data from the sensor 122 (e.g., detection of a presence of person or an object). Additionally or alternatively, the actuator 112 moves the projector 102 based on movement of a detected person or object (e.g., the projector 102 is moved to be oriented toward the detected person or object during movement thereof).

Figure 2:
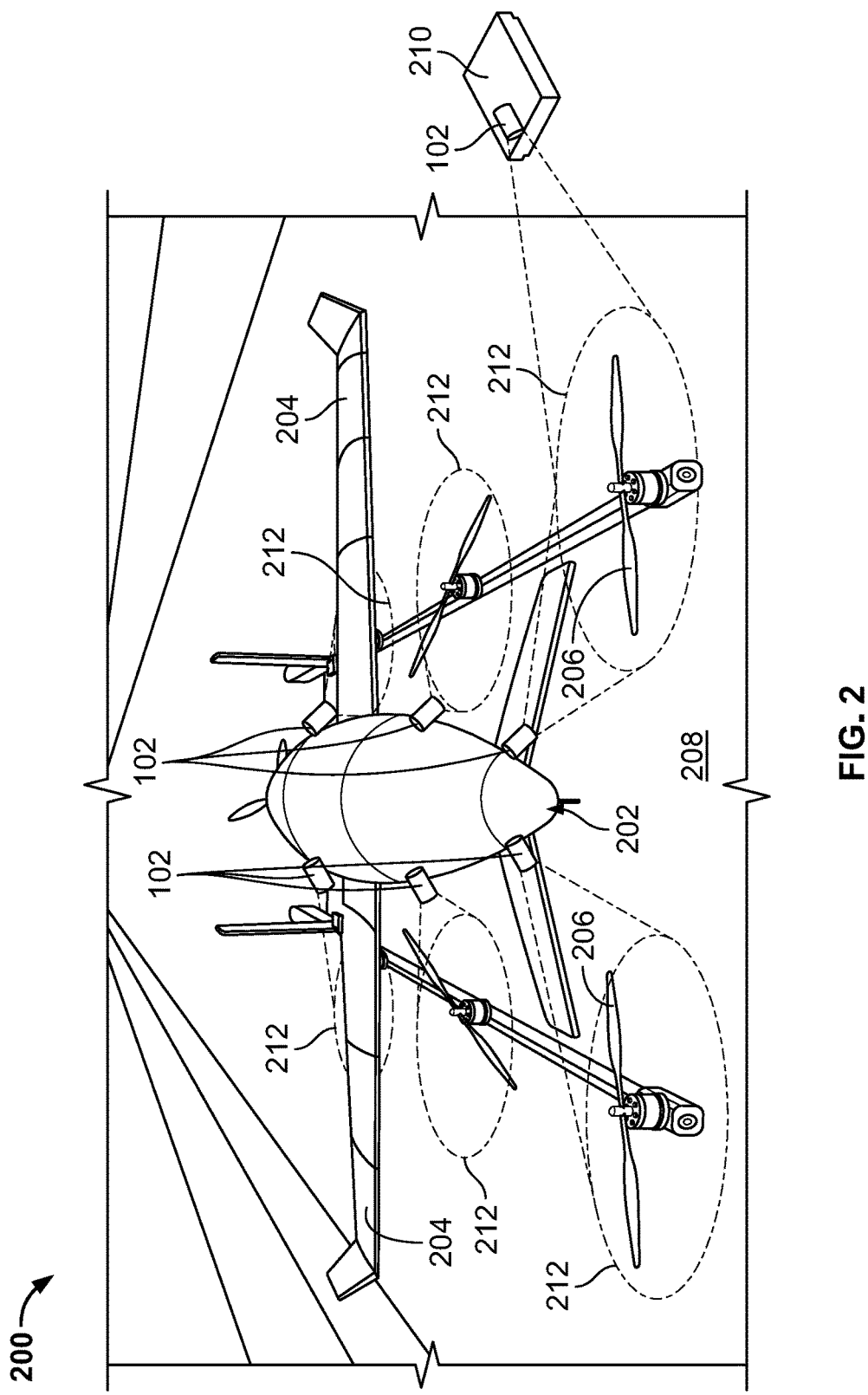
FIG. 2 depicts an example projector implementation for rotorcraft.

FIG. 2 depicts an example projector implementation for rotorcraft, unmanned aerial vehicles (UAVs) and/or non-fixed wing aircraft. In the illustrated example of FIG. 2, an aircraft 200, which includes a fuselage 202, wings 204 and rotors 206, is depicted positioned on a surface 208. The example aircraft 200 includes multiple ones of the projectors 102 corresponding to one of the rotors 206. Additionally or alternatively, a station (e.g., a ground station, an object-mounted station, a wall-mounted station, etc.) 210 is used to support, orient and/or position at least one of the projectors 102.

To indicate an area (e.g., a caution zone, a warning area, etc.) associated with the rotors 206, the projectors 102 of the illustrated example are implemented to project corresponding indicators (e.g., projections, laser projections, graphic projections, two-dimensional projections, etc.) 212 onto the surface 208. In this example, the indicators 212 are two-dimensional images that indicate a footprint of the spinning rotors 206. The indicators 212 can be utilized by a pilot of the aircraft 200. In particular, the indicators 212 can facilitate maneuvering of the aircraft 200 by enabling the pilot to clearly see a footprint of the spinning rotors 206, which would otherwise be difficult to see, to avoid objects or obstacles, etc. Additionally or alternatively, the indicators 212 convey and/or indicate that the rotors 206 are spinning to persons on the surface 208 (e.g., ground personnel, passengers, vehicles, etc.). In some examples, the indicators 212 are projected based on a detected presence of a person and/or object within a requisite distance of the aircraft 200 and/or the rotors 206 by the sensor 122 of FIG. 1. In some examples, a detected presence of a person near the indicators 212 disables the rotors 206 and/or causes an alarm to be triggered. In some such examples, the presence of the indicators 212 may facilitate determination of how close the person is to the indicators 212 (e.g., via a visual detection method performed by a camera or other sensor).

In some examples, the size and/or scale of the indicators 212 are varied based on (e.g., linearly based on) an aircraft parameter. In particular, the size and/or the scale of the indicators 212 can be varied based on a rotational speed of the rotors 206. For example, the indicators 212 increase in size and/or flash when rotors 206 are spinning at a relatively high speed and, likewise, decrease in size when the rotors 206 are spinning at a relatively lower speed. In other words, an indicated zone associated with the rotors 206 can be scaled in size. However, any other appropriate aircraft parameter can be used to scale the indicators 212 instead (e.g., hover height, aircraft altitude, aircraft speed, ground clearance, etc.). Additionally or alternatively, the indicators 212 change colors to indicate a context of the aircraft 200. In some examples, the indicators 212 blink and/or change colors based on a detected presence of a person or an object while the aircraft 200 is taking off, landing or sitting on the surface 208. In some examples, an intensity of the indicators 212 can be altered based on detected ambient light conditions (e.g., by use of a photocell). In some examples, reflective coatings or surfaces are implemented on the surface 208 and/or other surfaces near the surface 208 to enhance visibility of the indicators 212. In particular, high contrast coatings are used to cause specular reflections.

In some other examples, the indicators 212 are projected from the station 210, a structure standing on the surface 208 and/or the surface 208. In some examples, the network 121 shown in FIG. 1 may be implemented to facilitate the transmission of signals (e.g., signals associated with a condition of the aircraft 200) between the projection controller 120 (of FIG. 1) and the aircraft 200. In some examples, the sensor 122 (of FIG. 1) may detect a position and/or orientation of the aircraft 200 and direct the projection controller 120 to cause the projector 102, which may be implemented on the aircraft 200 or the station 210, to project the indicator 212 onto the surface 208 at a designated orientation or position. Additionally or alternatively, sensor data (e.g., positional and/or orientation data of the aircraft 200) from the sensor 122 can be analyzed to direct the actuator 112 to adjust an orientation of the lens 110 and/or the projector 102. In some examples, the indicators 212 are animated (e.g., moving graphics, etc.).

Figure 3A:
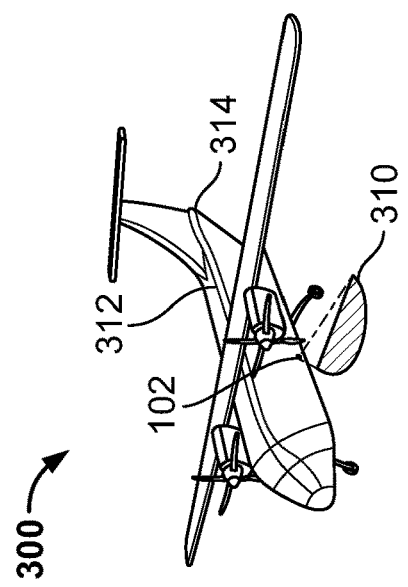
FIGS. 3A-3C depict example projector positions for fixed wing aircraft.
Figure 3B:
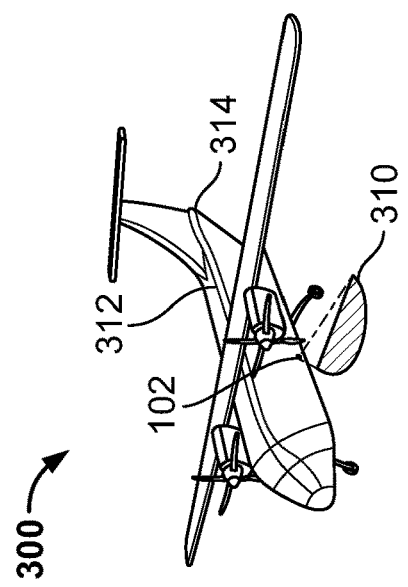
Figure 3C:
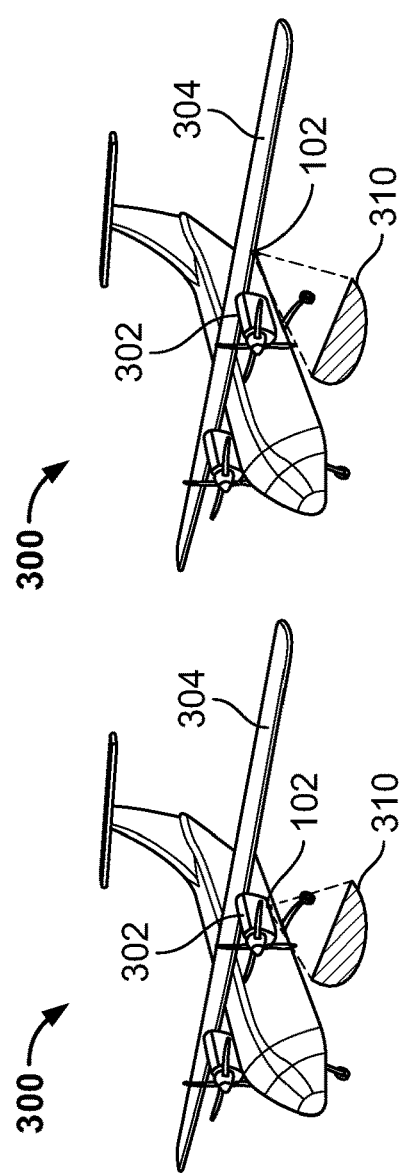

FIGS. 3A-3C depict example projector positions for fixed wing aircraft. Turning to FIG. 3A, a fixed wing aircraft 300 is shown. In the illustrated example of FIG. 3A, the projector 102 is mounted to a nacelle 302 of a wing 304. During operation, the projector 102 projects an indicator (e.g., a taxiing indicator) 310 on a surface generally in front of the wing 304.

FIG. 3B depicts the aircraft 300 of FIG. 3A, but with the projector 102 mounted onto the wing 304 instead of the nacelle 302. Similar to the example of FIG. 3A, the indicator 310 is projected onto the surface generally in front of the wing 304.

FIG. 3C depicts the aircraft 300, but with the projector 102 mounted onto a fuselage 312. In this example, the projector 102 projects the indicator 310 generally to the side of the fuselage 312. In other examples, the projector 102 may be positioned and/or mounted at the front or rear of the aircraft 300. Any combination of the example of FIGS. 3A-3C may be implemented. In some examples, multiple ones of the indicators 310 are projected from different areas of the aircraft 300. In some such examples, multiple ones of the indicators 310 may be superimposed to convey information. In other examples, the projector 102 is mounted to a tail 314 of the aircraft 300.

Figure 4A:
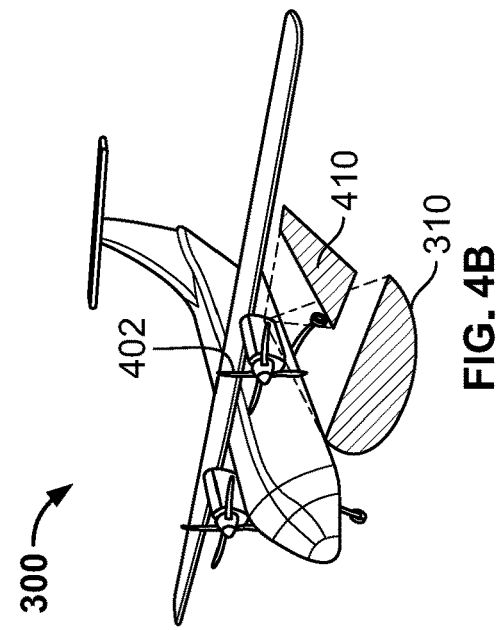

FIGS. 4A-7B depict example projector implementations for fixed wing aircraft. FIGS. 4A and 4B depict scaling that can be implemented in examples disclosed herein. Turning to FIG. 4A, the aircraft 300 is shown with the aforementioned indicator 310 of FIGS. 3A-3C. In this example, the indicator 310 includes a semicircular shape (e.g., an arc shape) corresponding to a propeller 402 such that a projected size of the semicircular shape indicates a power level of the propeller 402. Particularly, the example indicator 310 is scaled to have a size relative to the power level, speed, weather conditions, environmental conditions or any other appropriate parameter associated with the aircraft 300. In the illustrated view of FIG. 4A, the propeller 402 is at a relatively low power level.

Figure 4B:
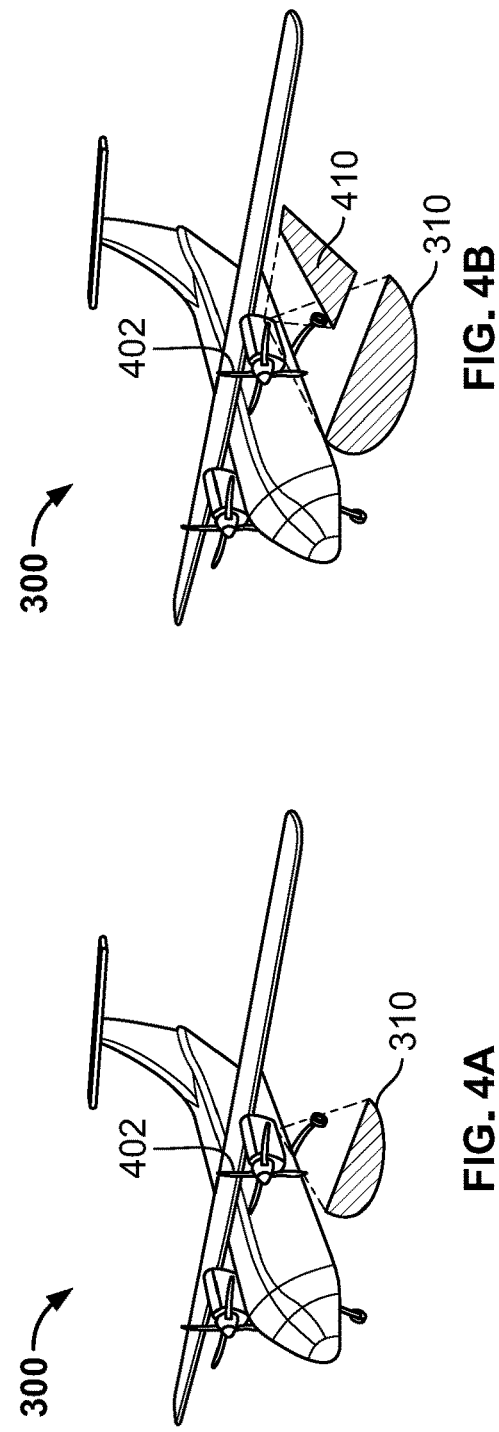

FIG. 4B depicts the aircraft 300 with the indicator 310 enlarged relative to the size shown in FIG. 4A. Particularly, the example of FIG. 4B corresponds to a relatively high power level of the propeller 402. Further, a projection 410 is also displayed to indicate that hot exhaust gasses are exiting a rear end of the nacelle 302. In some examples, a size of the projection 410 is scaled based on the power level of the propeller 402.

FIG. 5 depicts the aircraft 300 travelling (e.g., rolling) along a direction generally indicated by an arrow 501. In this example, in addition to projecting the aforementioned indicator 310, an indicator 502 is also projected. In particular, the example indicator 502 is projected to convey a moving aircraft warning, which may pertain to whether the aircraft 300 is about to taxi or currently taxiing. In some examples, the indicator 502 is projected when the aircraft 300 is flying close to the ground (e.g. during landing of the aircraft 300). Additionally or alternatively, the indicator 502 can indicate a short takeoff and landing (STOL) or vertical takeoff and landing (VTOL) operations of the aircraft 300.

In some examples, the indicator 502 includes text (e.g., projected text, lettering, etc.) 504. In particular, the projected text 504 may convey characters indicating a speed of the aircraft (e.g., text indicating speed in the form of "80 km/hr") or any other appropriate parameter or information. In some examples, a color of the indicator 502 is varied based on an operational context of the aircraft 300 (e.g., green is displayed for a speed of the aircraft 300 below a threshold value and red is displayed for a speed of the aircraft 300 above the threshold value).

FIGS. 6A and 6B depict example indications related to a stationary status of the aircraft 300. Turning to FIG. 6A, the aircraft 300 is shown with a nose cone 602 moving and/or displaced from its unfolded position. Accordingly, an indicator 604 is projected to indicate that the aircraft 300 and/or an opening 606 is accessible. In this example, the indicator is colored (e.g., colored green) to indicate that the aircraft 300 and/or the opening 606 is clear to approach.

FIG. 6B depicts the aircraft 300 in a stationary mode in which the aircraft 300 is not to be approached. In this example, the indicator 604 is displayed, but shown using a different color (e.g., red) from that of FIG. 6A. In some examples, text and/or graphics is displayed in conjunction with the indicator 604.

Figure 7A:
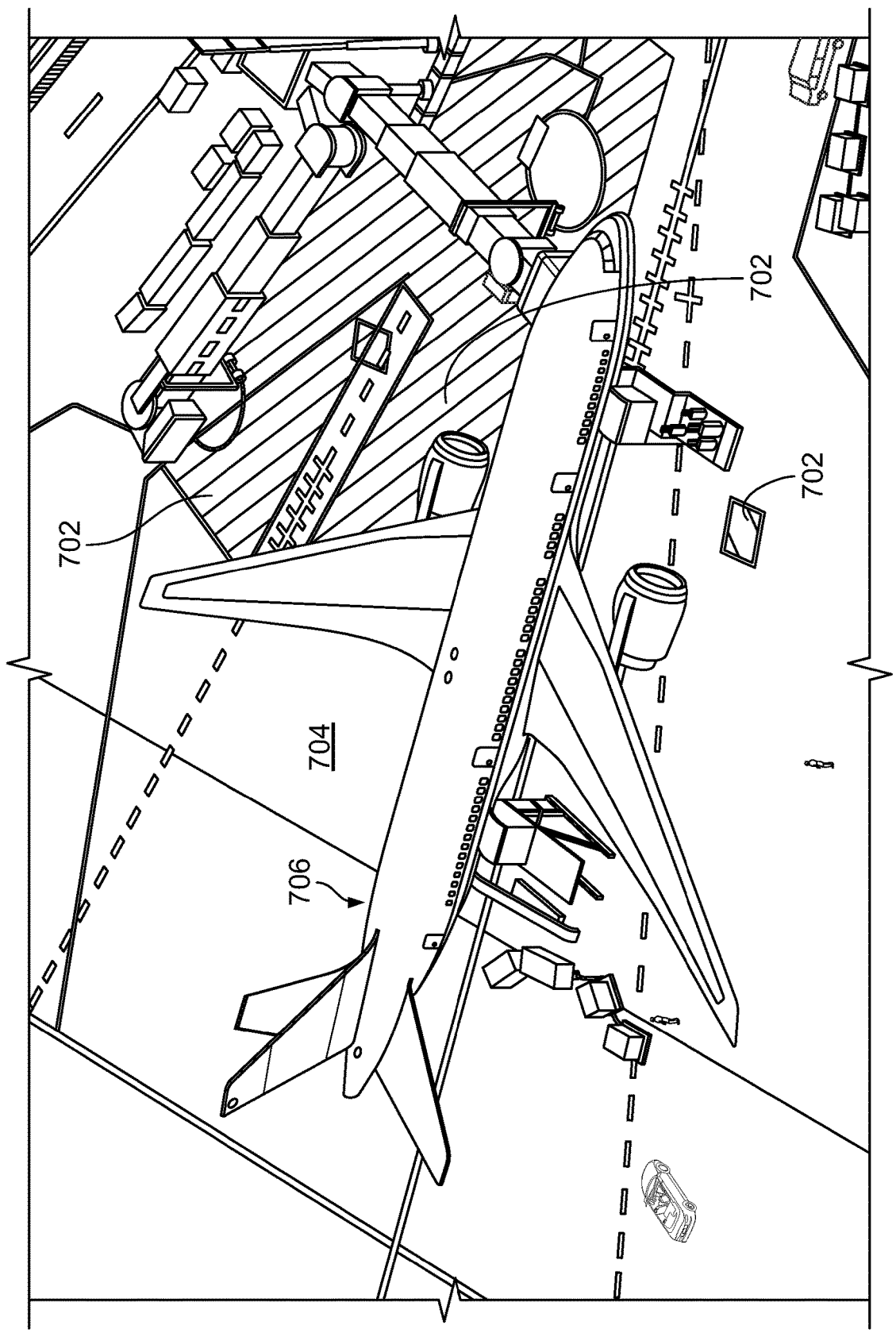
Figure 7B:
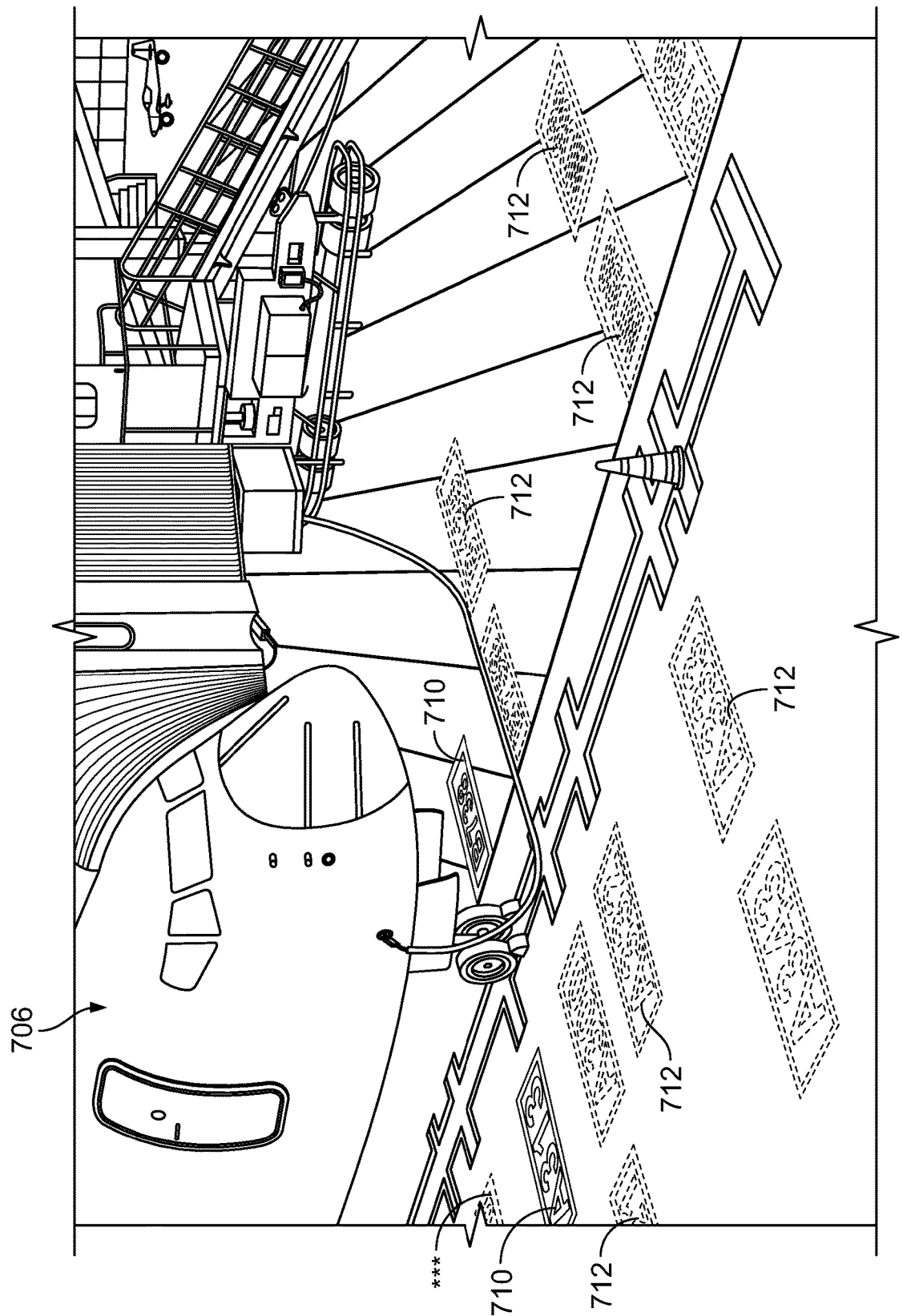

FIGS. 7A and 7B depict example projected indications for stationary aircraft. Turning to FIG. 7A, indicators 702 are projected onto a surface 704 in an aircraft parking area proximate an aircraft 706. In this example, the indicators 702 designate clearance areas (e.g., "keep out" areas) and/or equipment placement locations. Additionally or alternatively, the indicators 702 indicate an aircraft status (e.g., text characters indicating departure time, boarding status, luggage loading/unloading status, operational instructions, etc.). The indicators 702 may be projected from the aircraft 706, nearby equipment, the surface 704 and/or structures standing on the surface 704.

FIG. 7B depicts indicators 710 that are displayed based on an aircraft type of the aircraft 706. In this example, indicators 712 are not currently displayed, but can be projected for other types of aircraft positioned in the aircraft parking area shown in FIG. 7B. According to the illustrated example, the indicators 710, which are active in this example, convey equipment location and aircraft position markings specific to the aforementioned aircraft type.

While numerous features and implementations have been shown in conjunction with FIGS. 2-7B, any of the described features and/or aspects of these examples can be implemented in combination with any of the other examples.

Figure 8:
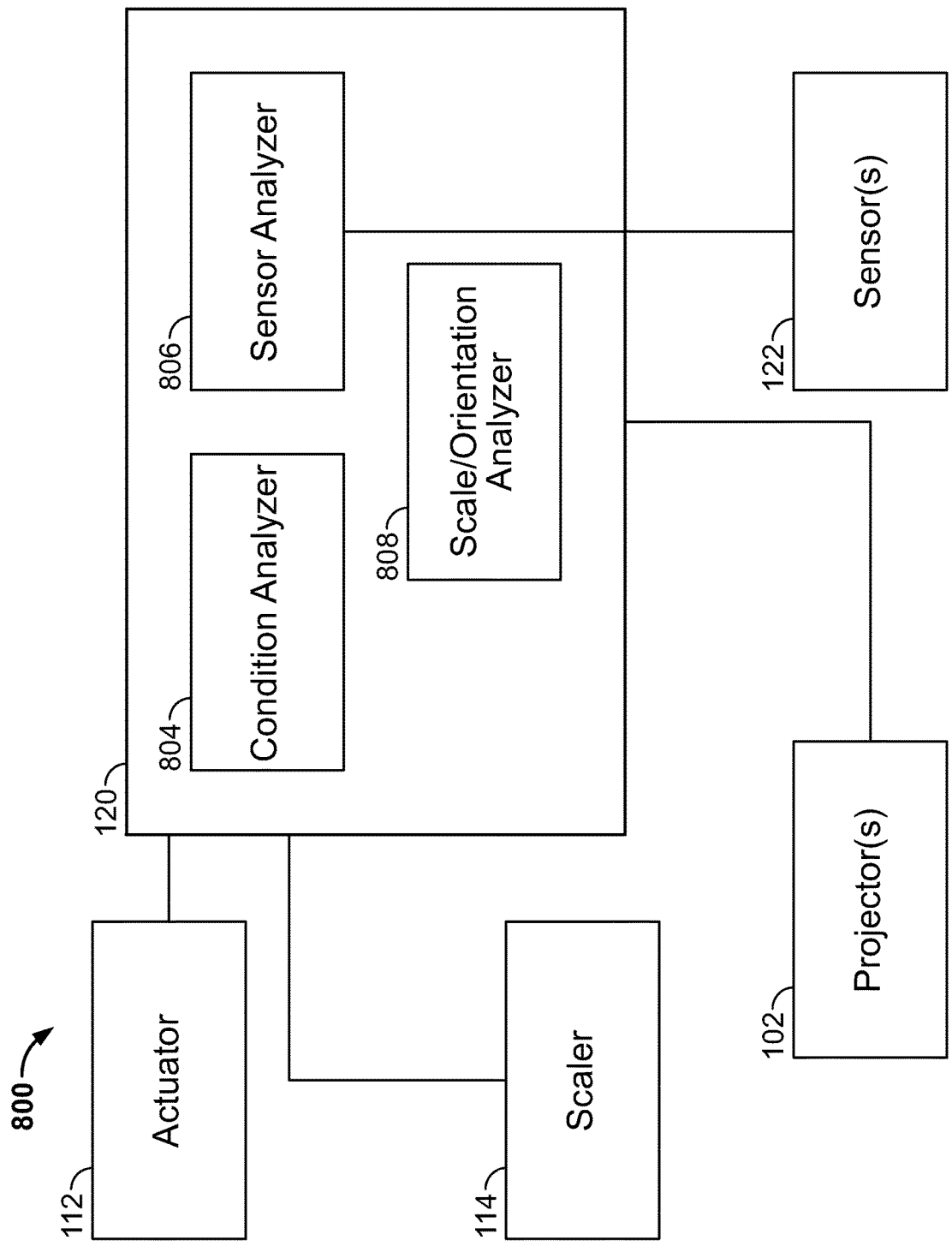
FIG. 8 is a schematic illustration of an aircraft zone indication control system to implement examples disclosed herein.

FIG. 8 is a schematic illustration of an aircraft zone indication control system 800 to implement examples disclosed herein. The aircraft zone indication control system 800 includes the projection controller 120, which is communicatively coupled to the actuator 112, the scaler 114, the projector(s) 102 and the sensor(s) 122. The projection controller 120 of the illustrated example includes a condition analyzer 804, a sensor analyzer 806 and a scale/orientation analyzer 808.

The example condition analyzer 804 determines a condition (e.g., an operating condition) and/or mode (e.g., a set mode, an operating mode, etc.) associated with an aircraft. In this example, the condition analyzer 804 determines the condition and/or the mode based on indications (e.g., an indication signal) from the aircraft. The indications can pertain to whether the aircraft is in flight, taxiing, moving, ready for cargo loading, etc. In turn, the example condition analyzer 804 determines (e.g., selects) an appropriate indicator and/or indicator parameter (e.g., indicator size, indicator color, text of the indicator, etc.). Additionally or alternatively, the condition is determined based on sensor data processed by the sensor analyzer 806 (e.g., a detected presence of a person or an object near the aircraft).

In examples where the sensor(s) 122 is implemented and/or sensor data is received via the network 121, the example sensor analyzer 806 receives sensor data from the sensor 122 and interprets and/or processes the sensor data. The sensor data can be measured from the ground (e.g., the sensor(s) 122 at the station 210) or by the sensor(s) 122 of the aircraft. The sensor data can be related to, but not limited to, a presence of an aircraft, a position of the aircraft, a speed of the aircraft, an attitude of the aircraft, a condition of the aircraft, an orientation or attitude of the aircraft, etc.

The scale/orientation analyzer 808 of the illustrated example controls a scale of the indicator via the scaler 114 and/or the actuator 112. In some examples, the scale of the indicator is proportional to an operational parameter of the aircraft. Particularly, the scale can be based on engine speed, aircraft speed, rotor speed, etc. Additionally or alternatively, the scale/orientation analyzer 808 directs movement of the actuator 112 to cause movement (e.g., rotational, translational) of the projector 102 and/or the lens 110 and, thus, adjust the displayed scale of the indicator.

While an example manner of implementing the aircraft zone indication control system 800 of FIG. 8 is illustrated in FIG. 8, one or more of the elements, processes and/or devices illustrated in FIG. 8 may be combined, divided, re-arranged, omitted, eliminated and/or implemented in any other way. Further, the example condition analyzer 804, the example sensor analyzer 806 and the example scale/orientation analyzer 808 and/or, more generally, the example aircraft zone indication control system 800 of FIG. 8 may be implemented by hardware, software, firmware and/or any combination of hardware, software and/or firmware. Thus, for example, any of the example condition analyzer 804, the example sensor analyzer 806, the example scale/orientation analyzer 808 and/or, more generally, the example aircraft zone indication control system 800 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example condition analyzer 804, the example sensor analyzer 806, and/or the example scale/orientation analyzer 808 is/are hereby expressly defined to include a non-transitory computer readable storage device or storage disk such as a memory, a digital versatile disk (DVD), a compact disk (CD), a Blu-ray disk, etc. including the software and/or firmware. Further still, the example aircraft zone indication control system 800 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
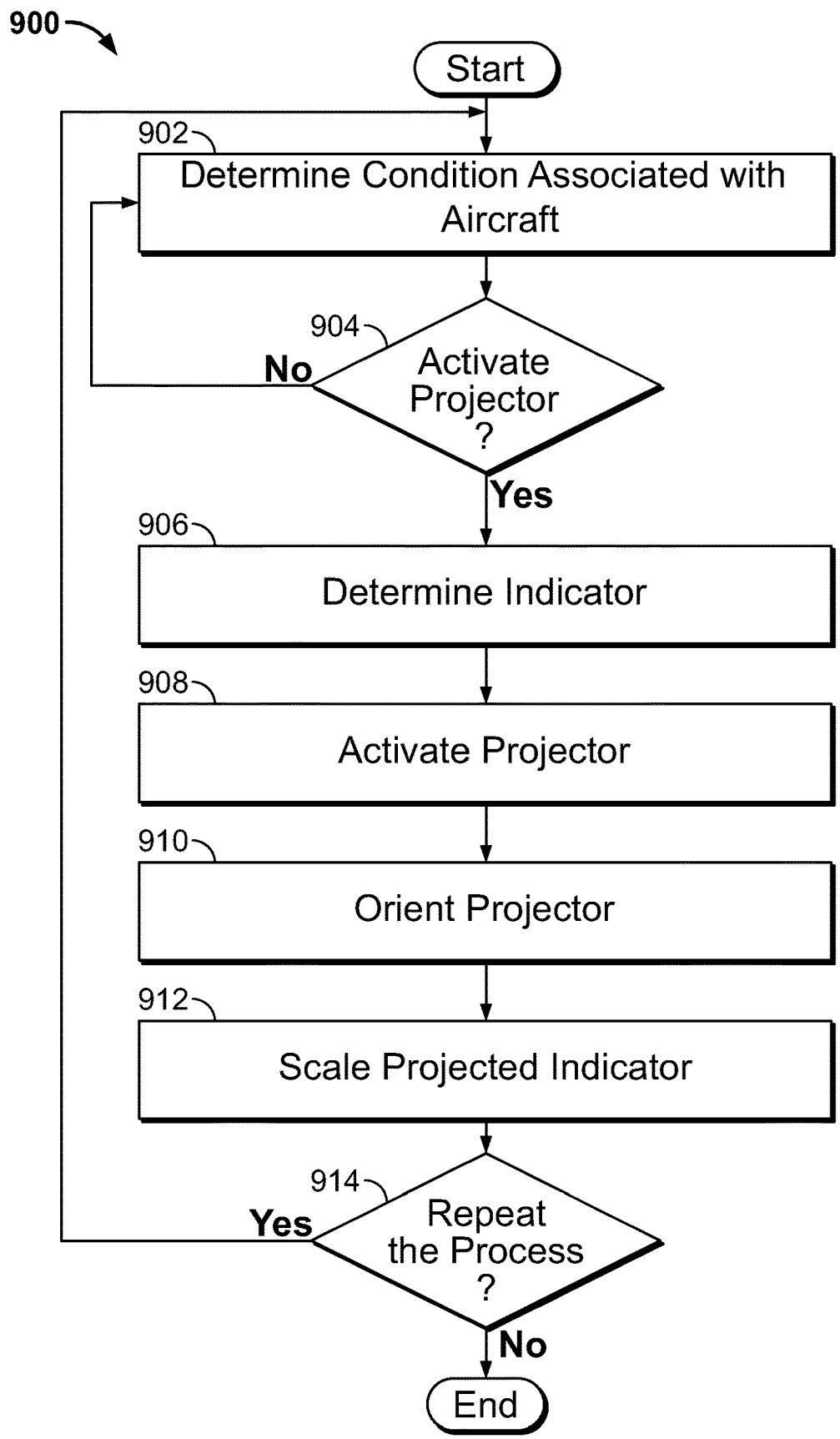
FIG. 9 is a flowchart representative of machine readable instructions which may be executed to implement the example aircraft zone indication projection system of FIG. 1 and/or the example aircraft zone indication control system of FIG. 8.

A flowchart representative of example hardware logic, machine readable instructions, hardware implemented state machines, and/or any combination thereof for implementing the aircraft zone indication control system 800 of FIG. 8 is shown in FIG. 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example aircraft zone indication control system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 900 of FIG. 9 begins as an indicator is to be projected toward a zone (e.g., a parking zone, a landing zone, a sitting zone) proximate an aircraft (e.g., the aircraft 200, the aircraft 300, the aircraft 706). In this example, the indicator is to be projected from the aircraft.

At block 902, the condition analyzer 804 determines a condition associated with the aircraft and/or an area surrounding the aircraft. In this example, the condition is determined based on a mode in which the aircraft is in (e.g., ready for takeoff, rotors spinning, etc.). Additionally or alternatively, the condition is determined based on sensor data from the sensor 122 and/or data (e.g., processed sensor data, analyzed sensor data, etc.) from the sensor analyzer 806.

At block 904, the condition analyzer 804 determines whether to activate the projector 102 based on the determined condition. If the projector 102 is to be activated (block 904), control of the process returns to block 902. Otherwise, the process proceeds to block 906. The determination may be based on whether the determined condition is associated with a respective indicator.

At block 906, the condition analyzer 804 determines the indicator to be projected proximate the aircraft. In particular, the example condition analyzer 804 references a database of indicators associated with different conditions. In this example, the condition analyzer 804 also determines image parameters associated with the projected indicator (e.g., size, color, text, symbols, etc.).

At block 908, the condition analyzer 804 activates the projector 102. In this example, the light source 104 and the display 108 are directed to project the indicator.

At block 910, in some examples, the scale/orientation analyzer 808 causes movement of the actuator 112 to adjust an orientation of the projector 102. In this example, the actuator 112 causes a rotational movement of the projector 102. Additionally or alternatively, the actuator 112 causes a translational movement of the projector 102. In some examples, the actuator 112 moves the lens 110.

At block 912, the scale/orientation analyzer 808 causes the scaler 114 and/or the actuator 112 to adjust a scale of the projected indicator. The scale may be adjusted based on an operational parameter (e.g., a rotor speed, a travel speed, an operational mode, etc.) of the aircraft.

At block 914, it is determined whether to repeat the process. If the process is to be repeated (914), control of the process returns to block 902. Otherwise, the process ends. In some examples, this determination is based on whether an aircraft is present within an aircraft zone or a requisite range of the aircraft zone.

Figure 10:
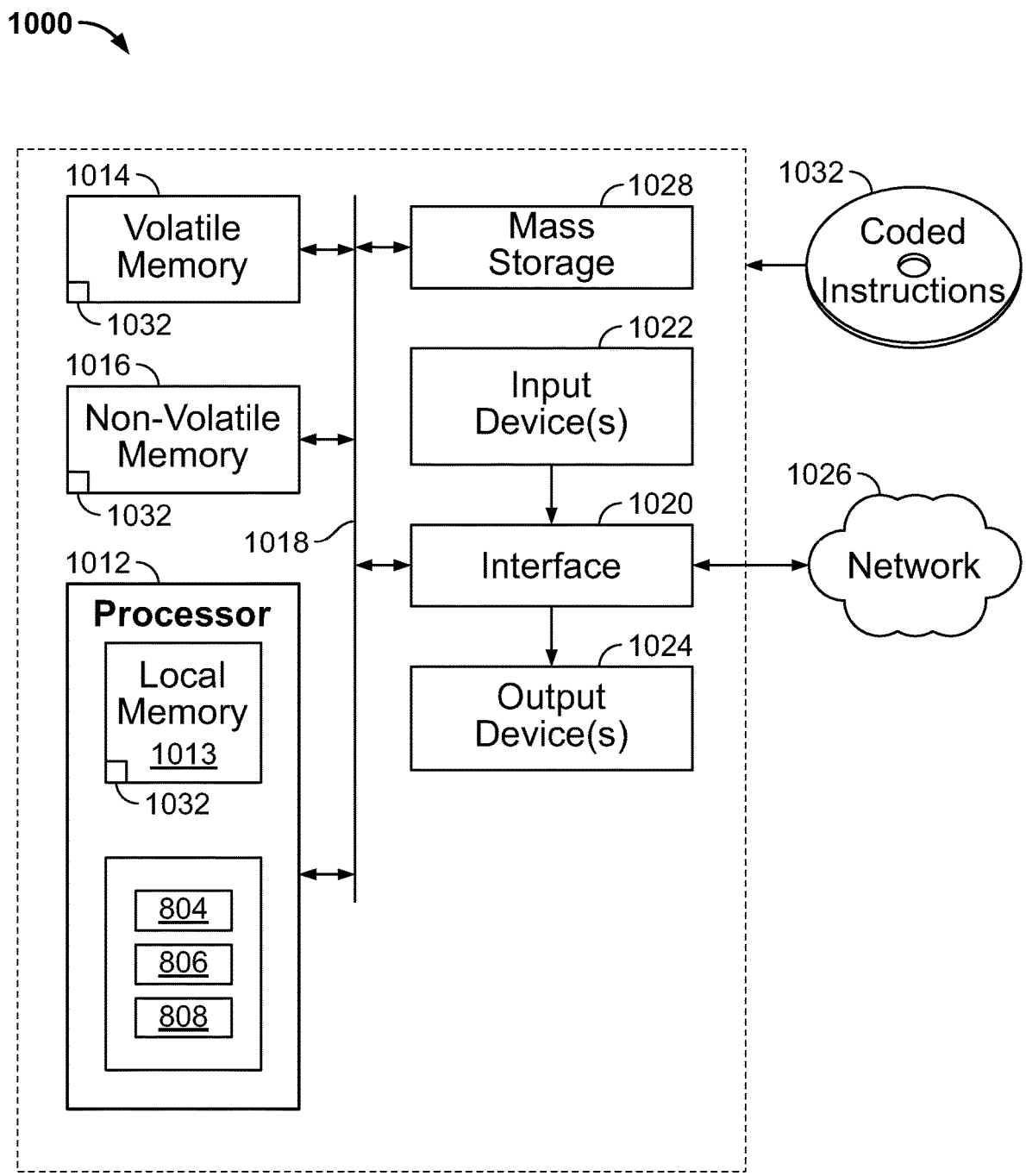
FIG. 10 is a block diagram of an example processing platform structured to execute the instructions of FIG. 9 to implement the example aircraft zone indication control system of FIG. 8.

FIG. 10 is a block diagram of an example processor platform 1000 structured to execute the instructions of FIG. 9 to implement the aircraft zone indication control system 800 of FIG. 8. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example condition analyzer 804, the example sensor analyzer 806 and the example scale/orientation analyzer 808.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable highly visible and informative display of aircraft indicators. Examples disclosed herein enable indicators to convey a significant amount of information. Examples disclosed herein enable indicators that match an aircraft type, model and/or condition to be conveyed. Example disclosed herein enable indicators to aid in navigating a vehicle, such as indicators conveying spinning rotors, for example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of aircraft, examples disclosed herein can be applied to any other appropriate application and/or vehicle (e.g., watercraft, land vehicles, autonomous vehicles, etc.).

The following claims are hereby incorporated into this Detailed Description by this reference, with each claim standing on its own as a separate embodiment of the present disclosure.

What is claimed is:

1. A projection system for displaying an indicator pertaining to an aircraft, the projection system comprising:
   a condition analyzer to determine a condition of at least one of the aircraft or a zone surrounding the aircraft, the condition corresponding to a value of at least one of a rotor speed or a travel speed of the aircraft;
   a projector to project the indicator on or proximate the zone based on the determined condition; and
   a scaler to adjust the projector to vary a scale of the projected indicator based on the value.

2. The projection system as defined in claim 1, further including a sensor, and wherein the projector is controlled based on sensor data from the sensor.

3. The projection system as defined in claim 2, wherein the sensor data corresponds to at least one of a person or an object in proximity of the aircraft.

4. The projection system as defined in claim 1, wherein the rotor speed corresponds to at least one of a propeller or an engine of the aircraft.

5. The projection system as defined in claim 1, wherein the projection system is positioned on the aircraft.

6. The projection system as defined in claim 1, wherein the projection system is positioned on a surface separate from the aircraft.

7. The projection system as defined in claim 1, wherein the projector is to project the indicator with a text display of the travel speed.

8. The projection system as defined in claim 1, wherein the projector is to project the indicator with a text display of the rotor speed.

9. The projection system as defined in claim 1, wherein the aircraft is a fixed wing aircraft.

10. The projection system as defined in claim 1, wherein the aircraft is manned.

11. A method comprising:
determining, by executing instructions with at least one processor, a condition associated with at least one of an aircraft or a zone surrounding the aircraft, the condition corresponding to a value of at least one of a rotor speed or a travel speed of the aircraft;
projecting, by a projector, an indicator onto the zone surrounding the aircraft based on the determined condition; and
adjusting, by a scaler, a scale of the projected indicator based on the value.

12. The method as defined in claim 11, wherein adjusting the scale of the projected indicator includes adjusting the scale of the indicator in proportion to the value.

13. The method as defined in claim 11, further including adjusting, by executing instructions with the at least one processor, an orientation of the projector.

14. The method as defined in claim 11, wherein the condition further corresponds to a presence of a person.

15. The method as defined in claim 14, further including projecting, via the projector, a warning onto the zone based on the presence of the person.

16. The method as defined in claim 11, further including varying an intensity of the indicator based on a detected ambient light condition.

17. A non-transitory machine readable medium comprising instructions, which when executed, cause at least one processor to at least:
determine a condition of at least one of an aircraft or a zone surrounding the aircraft, the condition corresponding to a value of at least one of a rotor speed or a travel speed of the aircraft;
determine an indicator based the determined condition;
cause a projector to project the indicator onto the zone based on the determined indicator; and
adjust, via the projector, a scale of the indicator based on the value.

18. The non-transitory machine readable medium as defined in claim 17, wherein the instructions cause the at least one processor to adjust the scale of the indicator to be proportional to the value.

19. The non-transitory machine readable medium as defined in claim 17, wherein the condition is determined based on sensor data.

20. The non-transitory machine readable medium as defined in claim 17, wherein the condition further corresponds to an operating condition or mode of the aircraft.

21. The non-transitory machine readable medium as defined in claim 17, wherein the instructions cause the processor to adjust an orientation of the indicator based on the condition.

* * * * *